United States Patent [19]

Schleiter, Sr.

[11] 4,253,489
[45] Mar. 3, 1981

[54] MAGNETIC LATCH FOR PRESSURE RELIEF VALVE

[75] Inventor: Daniel P. Schleiter, Sr., Mount Prospect, Ill.

[73] Assignee: Vapor Corporation, Chicago, Ill.

[21] Appl. No.: 92,527

[22] Filed: Nov. 8, 1979

Related U.S. Application Data

[63] Continuation of Ser. No. 825,275, Aug. 17, 1977, abandoned.

[51] Int. Cl.³ ............................................. F16K 15/03
[52] U.S. Cl. ..................................... 137/527; 251/65; 335/285
[58] Field of Search ................ 251/65; 137/529, 524; 335/285, 298, 301, 302, 527–527.8

[56] References Cited

U.S. PATENT DOCUMENTS

| 1,641,880 | 9/1927 | Cohen | 335/285 X |
| 2,693,382 | 11/1954 | Teetor | 335/285 X |
| 2,781,216 | 2/1957 | Foley | 335/285 |
| 2,801,870 | 8/1957 | Davey | 335/285 X |
| 2,813,741 | 11/1957 | Janos | 335/285 X |
| 2,970,857 | 2/1961 | Squire | |
| 3,009,725 | 11/1961 | Koch | 335/285 X |
| 3,502,361 | 3/1970 | Sieverin | 220/203 |
| 3,528,453 | 9/1970 | Dunkelis | 335/285 X |

Primary Examiner—William R. Cline
Attorney, Agent, or Firm—Francis J. Lidd

[57] ABSTRACT

A magnetic latch for a pressure or vacuum relief valve is disclosed. The pressure or vacuum relief valve includes a cover hingedly connected to a body and a valve seat defined on the body. The latch includes a housing having an open end and connected to either the valve cover or the body. A magnet is mounted within the housing. A striker plate is connected to the other of the valve cover or body in a position to engage the open end of the housing and to be spaced by a gap from the magnet in the valve closed position. The gap between the striker plate and the magnet is adjustable by varying the position of the housing relative to its mounted position. A spring is positioned between the striker plate and the cover or body and biases the striker plate toward the housing in the valve closed position to provide self-alignment and via its adjusting screw to ensure proper engagement of the striker plate with the open end of the housing.

9 Claims, 3 Drawing Figures

MAGNETIC LATCH FOR PRESSURE RELIEF VALVE

CROSS-REFERENCE TO RELATED APPLICATION

This is a continuation patent application of copending patent application Ser. No. 825,275 filed Aug. 17, 1977 now abandoned.

BACKGROUND OF THE INVENTION

A. Field of the Invention

The present invention generally relates to a new and improved magnetic latch for latching the cover of a pressure relief valve in a closed position.

B. Description of the Prior Art

Large volume tanks typically include a pressure or vacuum relief valve to relieve pressure or vacuum that may develop so as to prevent an unsafe condition.

Typically, the pressure or vacuum relief valve includes a valve seat as part of the body and a cover hingedly connected to the body and movable to a position to engage the valve seat in the valve closed position. If an undesirable pressure or vacuum level develops, the cover opens allowing relief of the pressure or vacuum.

One prior art type of the relief valve includes a spring or weight biasing the cover to the closed position. A disadvantage of this prior art valve is that the cover will not undergo a rapid release as undesirable pressures are developed; since the force against which the cover opens with a spring bias increases with the distance the cover has opened, or in the case of a weight biased cover, the force against which the cover opens remains large through the entire opening.

To overcome this disadvantage, several prior art valves provide a magnetic latch that includes a magnet for holding the cover in a closed position. As the cover opens in response to an undesirable pressure or vacuum level in the tank, the force of magnetic attraction between the magnet and the cover rapidly decreases as the distance between the cover and the magnet increases. Consequently, once a slight lifting of the cover occurs, the magnetic bond between the magnet and the cover is sufficiently broken that enough of the biasing force is removed to allow rapid movement of the cover toward the full opened position. Examples of this prior art valve are illustrated in U.S. Pat. Nos. 3,502,361 and 3,528,453.

Several disadvantages result from the employment of the prior art magnetic latches. One disadvantage is that it is necessary to vary the magnitude of the magnetic holding force in accordance with the selection of the pressure level at which the valve is to open. One prior art solution to this disadvantage is to include a plate connected to the cover or base that includes cut out portions that are positioned with respect to the magnet to vary the area of the plate attracted by the magnet and, thus, the force developed between the magnet and the plate. This procedure is somewhat cumbersome to adjust. In addition, it is limited as to the lower limits of adjustment.

A second difficulty with these prior art magnetic latches is that the magnet is exposed to ambient conditions and where ferric particles are present, these particles may short out the poles of the magnet and thus influence the force necessary for opening the valve.

SUMMARY OF THE INVENTION

An object of the present invention is to provide a new and improved pressure or vacuum relief valve for large volume tanks.

Another object of the present invention is to prevent loading forces on the latching mechanism during periods where differential pressures across the valve are in a direction opposite the opening direction.

Another object of the present invention is to provide a new and improved magnetic latch for a pressure or vacuum relief valve.

A further object of the present invention is to provide a new and improved magnetic latch for a relief valve the magnet of which is encased in a housing that provides protection against ambient conditions.

An additional object of the present invention is to provide a new and improved magnetic latch for a relief valve that allows the opening force developed by it to be easily adjustable over the entire range of the magnet.

Another object of the present invention is to provide a new and improved magnetic latch for a relief valve that is self-aligning to ensure uniform engagement of the latch during closing of the valve.

Briefly, the present invention is directed to a magnetic latch for use with relief valves that are employed on large volume tanks. The relief valve includes a valve seat which is part of the valve body and defined on the pressure tank and a cover hingedly connected to the body and movable to a position to engage the seat in the valve closed position. To hold the cover onto the seat in the valve closed position, a magnetic latch is employed.

The magnetic latch includes a magnet housing that is secured to either the body or the cover. A magnet is mounted within the housing and its poles are adjacent to the open end of the housing. A striker plate is secured to the other of the cover or body and engages the open end of the housing in the valve closed position.

The magnet is spaced from the striker plate in the valve closed position by a gap that is adjustable to vary the holding force of the magnet. The striker plate is universally coupled to the cover or the body and biased toward the magnet housing by a spring such that the striker plate is self-aligning during operation.

BRIEF DESCRIPTION OF THE DRAWING

The above and other objects and advantages and novel features of the present invention will become apparent from the following detailed description of a preferred embodiment of the invention illustrated in the accompanying drawing, wherein.

DESCRIPTION OF THE PREFERRED EMBODIMENT

Figure 3:
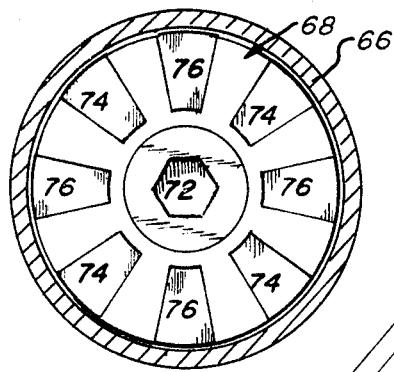
FIG. 3 is a plan view of the magnet of the latch taken along line 3—3 in FIG. 2.

Referring to the drawing, there is illustrated a new and improved magnetic latch constructed in accordance with the principles of the present invention and designated as a whole by the reference numeral 10. The magnetic latch 10 is used to latch a vacuum relief valve generally designated by the reference numeral 12 that is used in a large volume tank to vent a vacuum of an undesired level that may develop within the tank. If vacuum reaches this level, the force due to the differential pressure overcomes the magnetic force developed by the latch 10 and opens the relief valve 12 venting the tank.

The relief valve 12 is employed to vent through an opening 14 into a large volume tank 16. The relief valve 12 opens if an undesirable level of negative pressure or vacuum develops in the tank 16.

The pressure relief valve 12 includes a valve seat 18 defined around the opening 14. The seat 18 is engaged and sealed by the pallet or cover 20 of the relief valve 12. To provide a tight seal, an optional soft seal 22 is embedded in the seat 18 and is engaged by the outer peripheral edge of the cover 20. The seal 22 is employed in place of the diaphragms used in some prior art valves.

The cover 20 is attached to the body 19 mounted to the tank 16 in a manner to allow the cover 20 to pivot away from the seat 18 venting the tank 16 upon the occurrence of an undesired level of vacuum within the tank 16.

Figure 1:
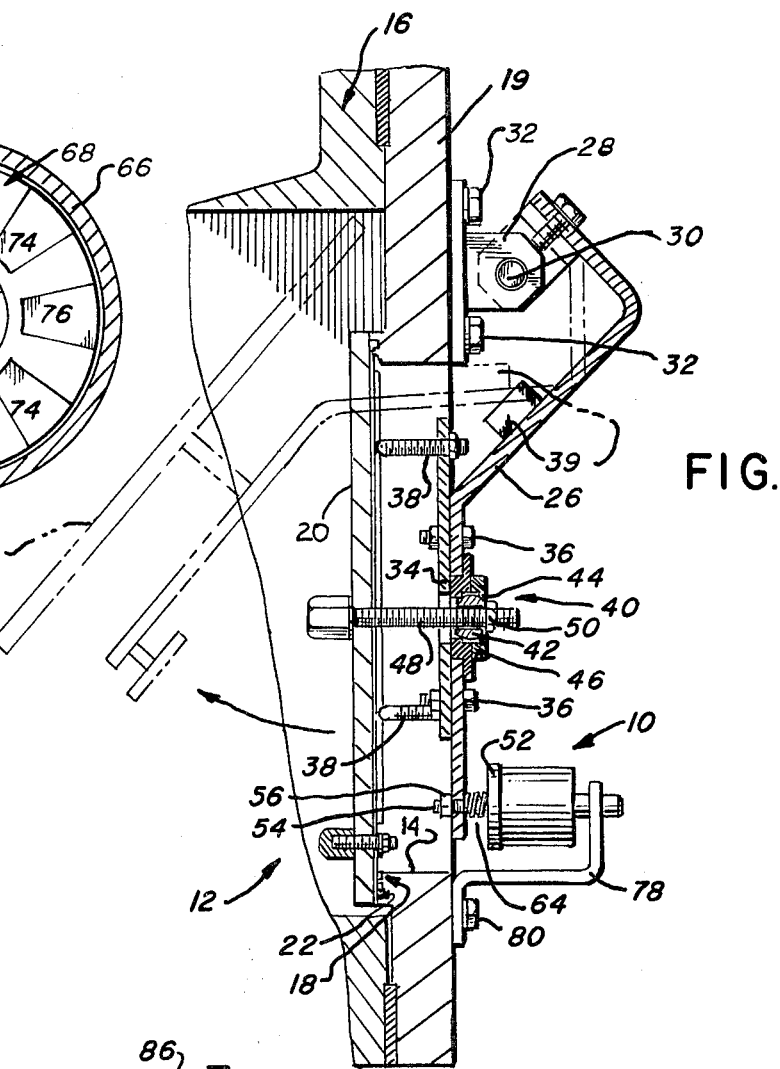
FIG. 1 is a cross-sectional view of a vacuum relief valve including a magnetic latch constructed in accordance with the principles of the present invention.
Figure 2:
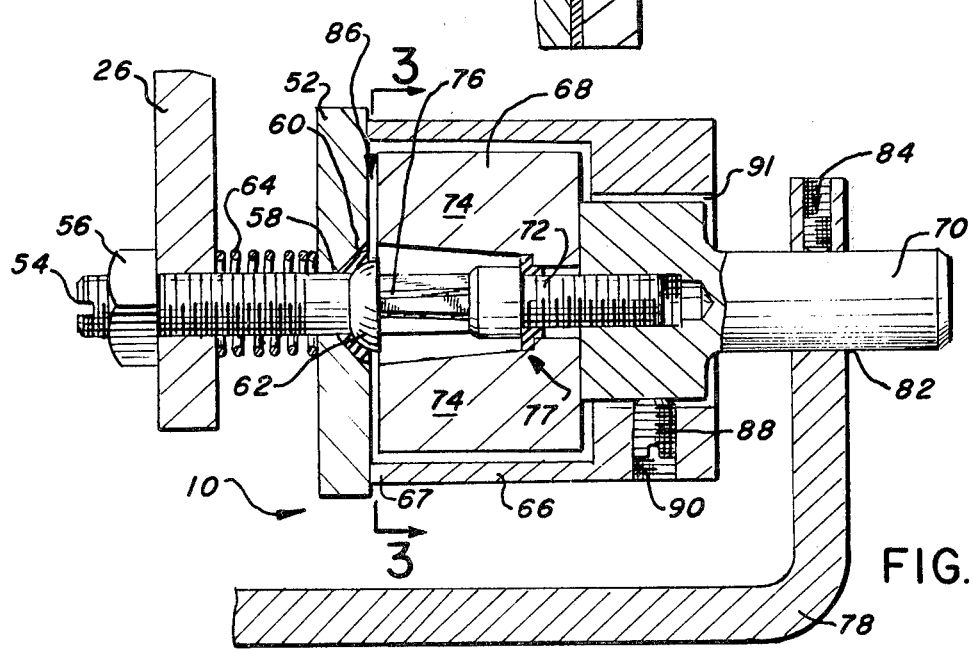
FIG. 2 is an enlarged cross-sectional view of the magnetic latch illustrated in FIG. 1.

To provide the pivotal or hinged connection of the cover 20 to the body 19, a bracket 26 is pivotally coupled to a hinge 28 by a pin 30. The hinge 28 is secured to the body 19 by bolts 32. The bracket 26 in turn is bolted to a plate member 34 by bolts 36 and the plate 34 is connected to the cover 20 by adjustable heel pins 38. The heel pins 38 allow the angle and lost motion between the plate 34 and the cover 20 to be adjusted during the installation of the pressure relief valve 12 and the latch 10 to provide the proper alignment and seating. The bracket 26 also includes a stop 39 that engages the body 19 in the valve open position (shown in phantom in FIG. 1) to stop the pivoting of the cover 20 at a point such that the cover lies in a plane at approximately 45° to the body 19.

The cover 20 is also coupled to the bracket 26 by a universal joint or coupling generally designated by the reference numeral 40. The universal joint 40, as will be discussed hereinafter, allows self-alignment of the cover 20 with the opening 14 as well as with the latch 10. The joint 40 includes a spherical bearing 42 that is mounted within a bore 44 defined by a block 46. The bearing 42 and the block 46 are secured to the bracket 26 and the plate 34 by a bolt 48 and nut 50.

Also secured to the bracket 26 at a distal end thereof is a striker plate 52 that in the valve closed position engages the latch 10. The striker plate 52 is mounted on the bracket 26 so as to engage the magnetic latch 10 when the cover 20 of the relief valve is closed engaging the seat 22. The plate 52 is coupled to the bracket 26 by a mounting plate adjusting screw 54 and nut 56 and includes an aperture 58 through which the adjusting screw 54 extends. The aperture 58 includes a bevel 60 within which the rounded head 62 of the adjusting screw 54 is positioned. In this manner, the striker plate 52 is allowed to pivot in a plane transverse to the axis of the bolt 54 allowing self-adjustment of the plate 52 relative to the housing 66.

Positioned between the striker plate 52 and the bracket 26 and encircling the adjusting screw 54 is a compression spring 64. The compression spring 64 serves to bias the striker plate 52 against the rounded head 62 of the adjusting screw 54.

The latch 10 includes a housing 66 having an upper open end 67 that is engaged by the plate 52 in the valve closed position. Upon the striker plate 52 engaging the housing 66, the magnetic force of the latch 10 holds the striker plate 52 onto the housing 66 with a force of a predetermined magnitude that is proportional to the force that must be developed within the tank 16 before the relief valve 12 will open and the cover 20 will pivot away from the seat 22. This force is transmitted to the cover 20 through the adjusting screw 54 which is adjusted for no gap between the head 62 and the striker plate 52 with the cover 20 in the closed position and no differential pressure across the cover 20.

To develop the latching force, the magnetic latch 10 includes a magnet 68 mounted within the housing 66 and secured to a mounting stem 70 by a threaded bolt 72 through a spacer 77. The magnet 68 may be one piece or as in the preferred embodiment illustrated may be serrated and defined by a plurality of alternating north 74 and south 76 magnetic poles (FIG. 3). In the preferred embodiment illustrated, the housing 66 is non-magnetic; and in addition to protecting the magnet 68 from ambient conditions, the housing 66 assists in establishing the magnetic field so as to enhance the holding force of the magnet 68.

To secure the latch 10 to the body 19, the stem 70 is secured to a bracket 78 that in turn is connected to the body 19 by a bolt 80. It should be understood, however, that the latch 10 could be secured to the cover 20 and the plate 52 secured to the body 19. The stem 70 extends through an aperture 82 defined in the bracket 78 allowing the magnet 68 to be adjusted relative to the plate 52 by a set screw 84. By loosening the set screw 84 defined in the bracket 78, the stem 70 may be moved relative to the bracket 78 to adjust the position of the magnet 68. This adjustment defines a gap generally designated by the reference numeral 86 between the upper open end 67 of the housing 66 and the striker plate 52. As will be understood, the smaller the gap 86, the greater the magnetic attraction between the magnet 68 and the striker plate 52 and thus the greater force or pressure that must be developed within the tank 16 before the cover 20 will lift from the seat 22. In this manner, the opening force of the relief valve 12 can be adjusted to the desired level.

The gap 86 is defined by the distance between the open end 67 of the housing 66 and the upper end of the magnet 68 since the striker plate 52 engages the upper, open end 67 of the housing 66 when the cover 20 is closed. Accordingly, after the position of the magnet 74 relative to the bracket 78 has been adjusted through the employment of the stem 70 and the set screw 84, the position of the open end 67 of the housing 66 relative to the upper end of the magnet 68 may be adjusted through the employment of a set screw 88 positioned within an aperture 90 defined in the housing 66. The housing 66 encircles the magnet 68 and the stem 70 extends through an aperture 91 in the housing 66 such that the housing 66 may be moved axially relative to the magnet 68.

By elevating the housing 66 relative to the magnet 68 and then tightening the set screw 88 onto the stem 70, the gap 86 is increased since the upper, open end 67 of the housing 66 is elevated relative to the magnet 68. Once the gap 86 is adjusted to its desired point, the gap between the bevel 60 of the striker plate 52 and the rounded head 62 of adjusting screw 54 is adjusted to zero gap or zero differential pressure across cover 20 and locked in place by nut 56. In this manner the gap 86 and thus the force holding the cover 20 closed is varied. Moreover, once the gap 86 has been selected, increased pressure on the cover 20 forcing it against the seat 18 will not vary the gap 86 and thus the opening force, since under these circumstances, the spring 64 is compressed and the position of the plate 52 relative to the end 84 is not altered. To protect the seal 22 during increased pressure situations, as the pressure in the tank increases, the bracket 26 moves toward the housing 66 causing bolt 54 to move toward bolt 72. If the pressure attains a preselected level, the head 62 of bolt 54 engages the head of bolt 72 terminating further movement of the bracket 26 and compression of the seal 22. In this condition, however, the gap 86 is not varied since bolts 54 and 72 are of sufficient strength to withstand increased pressure tending to force the bracket toward the housing 66.

The operation of the latch 10 and the valve 12 begins upon closing of the cover 20 on the seat 18. As this occurs, the striker plate 52 engages the upper end 67 of the magnet housing 66; and through the engagement of the bevel 60 of the striker plate 52 through aperture 58 and the adjusting screw rounded head 62, the striker plate 52 can exert a force on the cover 20. The striker plate 52 via contact with the upper end 67 of the housing and pivoting on adjusting screw rounded head 62 aligns itself to ensure complete contact with the entire upper end 67. In addition, as the cover 20 closes, the spring 64 is realigned slightly due to the closure force and weight of the bracket 26 and cover 20. During closing of the valve 12, the spherical bearing 42 allows additional self-alignment of the cover 20 and the seat 18.

In the closed position, the cover 20 engages the seat 18 and provides a seal closing the relief valve 12. As pressure within the tank 16 attains an undesirable level, the cover 20 begins to pivot lifting the striker plate 52 from the open end 67 of the housing 66. As this occurs, the magnetic attraction between the magnet 68 and the striker plate 52 rapidly decreases allowing rapid opening of the relief valve 12.

After the cover 20 opens to the position illustrated in the phantom lines in FIG. 1 and once the undesirable vacuum is relieved, the cover 20, under the influence of gravity, returns to its closed position illustrated in solid lines in FIG. 1 and is again held in a closed position by the latch 10.

While the invention has been described with reference to details of the illustrated embodiment, it should be understood that such details are not intended to limit the scope of the invention as defined in the following claims.

What is claimed and desired to be secured by Letters Patent of the United States is:

1. A magnetic latch for latching a pressure or vacuum relief valve for a fluid tank in the closed position, said valve defined by a cover hingedly coupled to a body for relative movement thereto and a valve seat defined on said body and aligned with an opening in said body through which said pressure or vacuum may be relieved, said latch comprising a housing including at least one open unobstructed end, means for securing said housing to one of said body and said cover, a striker plate secured to the other of said body and said cover at a position to engage said open end of said housing upon said striker plate with the cover engaging said valve seat in the valve closed position, a magnet mounted in said housing including a first end adjacent said open end and spaced by an unobstructed gap from said striker plate in the valve closed position, and means for varying the size of said gap thereby adjusting the force required to open said valve.

2. The latch set forth in claim 1 wherein said striker plate is connected to said other of said body and cover by a universal connection and adjusting screw, and means for biasing said plate toward said housing.

3. The latch set forth in claim 1 wherein said housing is nonmagnetic.

4. The latch set forth in claim 1 wherein said first end of said magnet is serrated and includes alternating north south poles.

5. A magnetic latch for a pressure relief valve for large volume tanks, said valve includes a valve seat and a cover adapted to engage said valve seat upon valve closure, said latch comprising a striker plate movably secured to one of a body mounted to said tank and said cover, means for creating a magnetic field for interacting with said plate to hold said valve closed, means for resiliently biasing said plate toward said magnetic means, and a housing having at least one unobstructed open end secured to the other one of said body and said cover, and a magnet mounted within said housing, said plate aligned to engage said open end of said housing and spaced by a gap from said magnet when said valve is closed, means for securing said magnetic means to said housing, and means for securing said housing to said magnetic means and for varying the position of said housing relative to said magnetic means thereby varying the size of said gap.

6. The latch claimed in claim 5 wherein said magnet is serrated and defined by alternating north south poles.

7. The latch claimed in claim 6 wherein said magnet is a cylindrical alloy magnet.

8. The housing claimed in claim 5 wherein said housing is nonmagnetic.

9. The latch claimed in claim 5 further comprising means for providing a universal coupling of said plate to said one of said body and said cover.

* * * * *